Jan. 29, 1929.  G. H. ROSS  1,700,517
ROACH EXTERMINATOR
Filed April 25, 1927    2 Sheets-Sheet 1
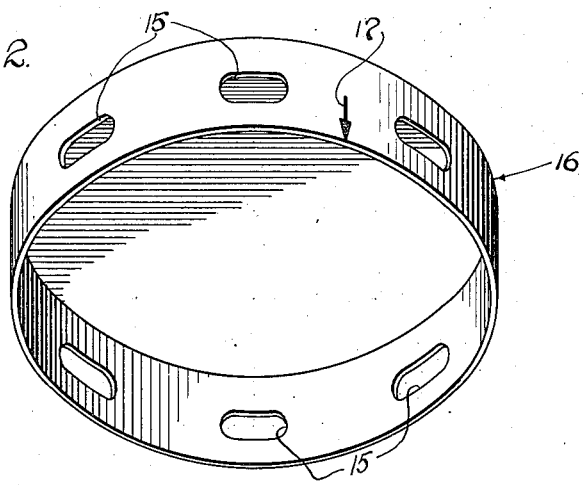
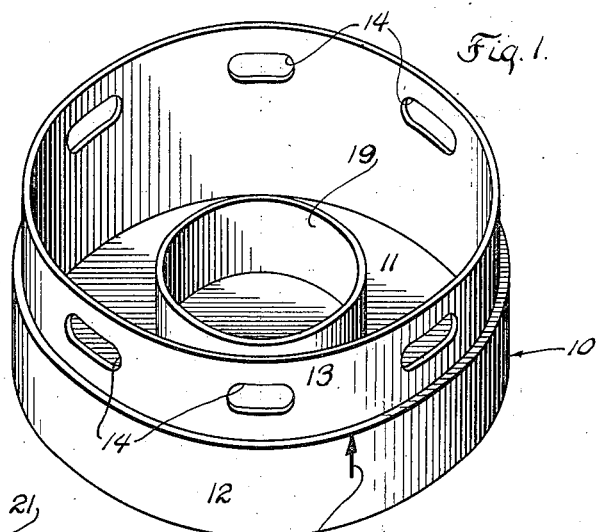
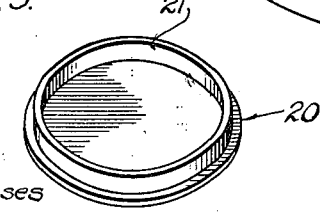
Inventor:
George Harris Ross.

Jan. 29, 1929. 1,700,517

G. H. ROSS

ROACH EXTERMINATOR

Filed April 25, 1927    2 Sheets-Sheet 2

Witnesses
F. C. Appleton

Inventor:
George Harris Ross.
By Joshua R H Polk
his Attorney

Patented Jan. 29, 1929.

1,700,517

UNITED STATES PATENT OFFICE.

GEORGE HARRIS ROSS, OF CHICAGO, ILLINOIS.

ROACH EXTERMINATOR.

Application filed April 25, 1927. Serial No. 186,194.

My invention relates to a roach exterminator, and the object of my invention is to provide a roach exterminator which is cheap to manufacture, very simple in construction and extremely efficient in operation.

My invention will be best understood by reference to the accompanying drawings forming a part of this specification and in which, Figure 1 is a perspective view of a fibrous box such as pasteboard incorporating my invention when taken together with Figures 2 and 3, which are also perspective views of other portions of this invention.

Figure 4:
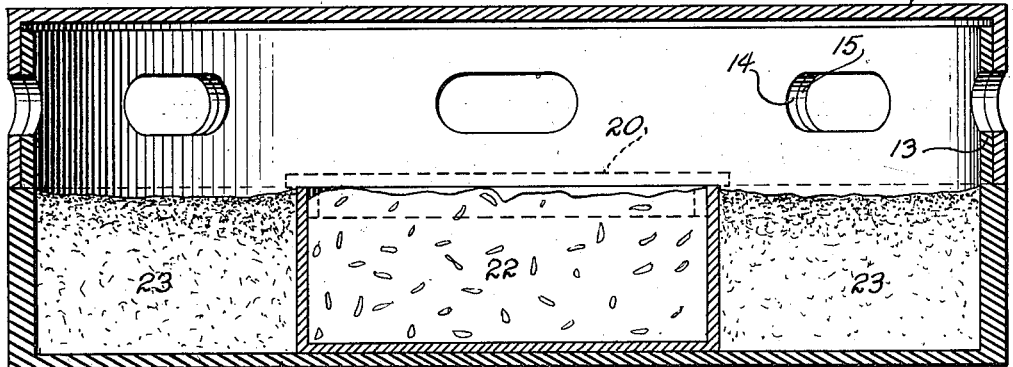
Figure 4 is a cross-sectional view of that disclosed in Figures 1 and 2 and showing my device arranged as in operation.
Figure 5:
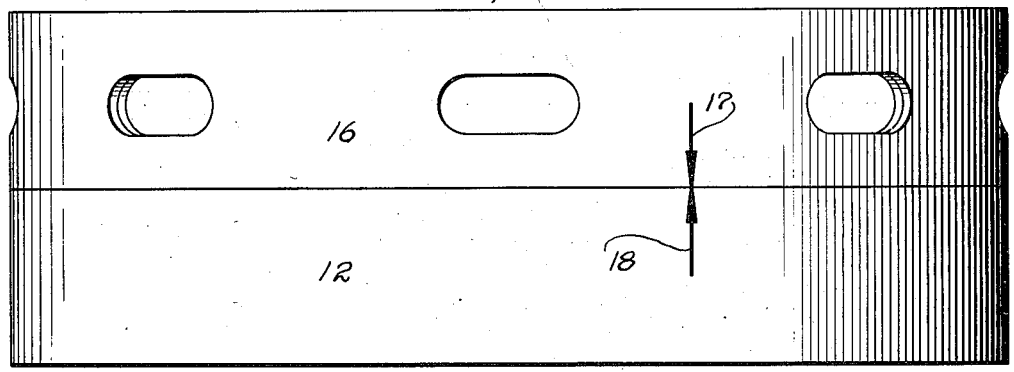
Figure 5 is a vertical plan view of that disclosed in Figure 4.
Figure 6:
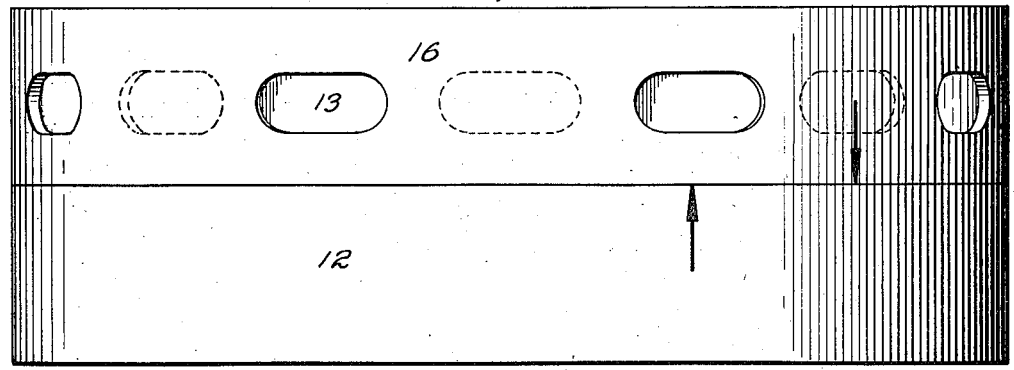
Figure 6 is a view similar to Figure 5 with the exception that the lid member is turned to such a position that the entrance holes are closed as when not in use.

In the drawings and for the purpose of illustration I have shown the preferred embodiment of my invention in which 10 represents a fibrous box such as pasteboard or other suitable material having a bottom 11 and sides 12. The upper portion 13 of the side member 12 is of reduced thickness and provided with openings 14 which are adapted to register with openings 15 in the cover member 16 when the arrows 17 and 18 are in the position shown in Figure 5, and the openings 15 and 16 are of such a length that they may be turned out of registration with each other by rotating the cover 16 into the position shown in Figure 6.

In approximately the center of the box 10 is provided a smaller box 19 which is glued or otherwise suitably secured to the bottom 11. The box 19 is provided with a cover 20 having a flange 21 adapted to fit within the side members of said box 19. Within the box 19 is placed a bait 22 of bread or other suitable material for attracting the roaches, and around the box 19 and within the box 10 is provided a ring of sodium fluorid 23 which is in powder form.

In order to reach the bait 22 the roaches must enter through the openings 14 and 15 and walk across the sodium fluorid to the edge of the box 19 and in so doing, the powdered sodium fluorid sticks to their antennas and feet to a certain extent and the roaches, for the purpose of cleaning their feet and antennas, draw the same through their mouth and in so doing get particles of the sodium fluorid into their system, which is poisonous to them and they die in a short while thereafter. The habits of roaches have heretofore been discovered and are specifically treated by the United States Department of Agriculture, Bulletin No. 707, issued August 26, 1918, and having this knowledge at hand I have created this invention which has proved very successful in practice. When in operation it is, of course, necessary to remove the small lid 20 and rotate the lid 16 into the position shown in Figure 5 so that the openings 14 and 15 in the flanges 13 and 24, respectively, permit the roaches to enter the exterminator.

While I have described my invention in its preferred form it is obvious that variations may be made therein without departing from the spirit of the invention. I do not, therefore, wish to be limited to the precise details of construction set forth but desire to avail myself of such variations and modifications as come within the scope of the appended claims.

I claim as my invention:

1. A device of the class described comprising a container for a roach poison; a bait box for a roach bait, within said container; a cover for said container; holes in the sides of said container adapted to register with similar holes in the flange of said cover, for permitting roaches to enter therethrough; bait within said bait box and roach poison within said container.

2. A device of the class described comprising a bait box secured within a larger container, and having bait therein; a roach poison in said larger container distributed around said bait box; a cover for said container having a flange thereon; openings in the sides of said container; said flange being adapted to cover said openings.

3. A device of the class described comprising a bait box containing bait accessible to roaches, secured within a larger container; said larger container having a roach poison therein, distributed around said bait box; openings in said larger container for permitting roaches to gain access thereto; and means for opening and closing said openings.

In testimony whereof I have signed my name to this specification.

GEORGE HARRIS ROSS.